(No Model.) 2 Sheets—Sheet 2.
J. GOODRICH.
FOOT POWER BENCH VISE.
No. 378,362. Patented Feb. 21, 1888.
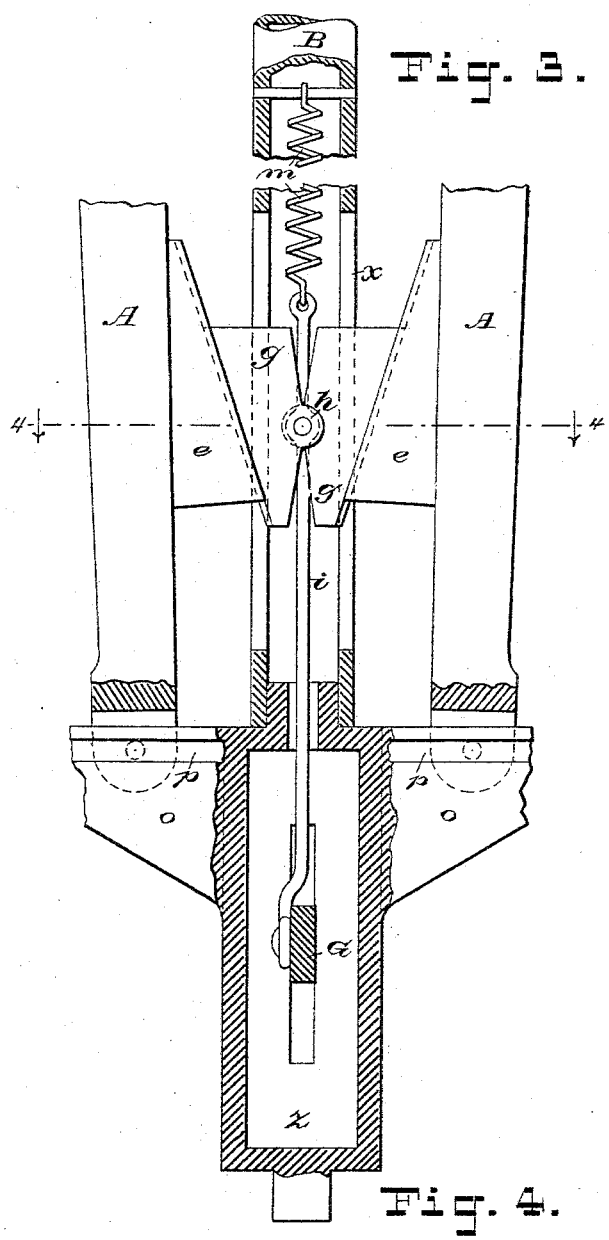
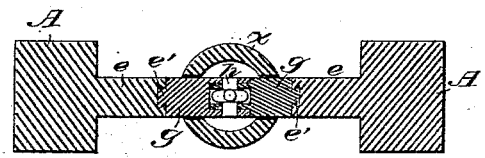
WITNESSES:
Geo. H. Fraser.
E. B. Bolton.
INVENTOR:
Joseph Goodrich.
By his Attorneys,
Burke, Fraser & Connett.

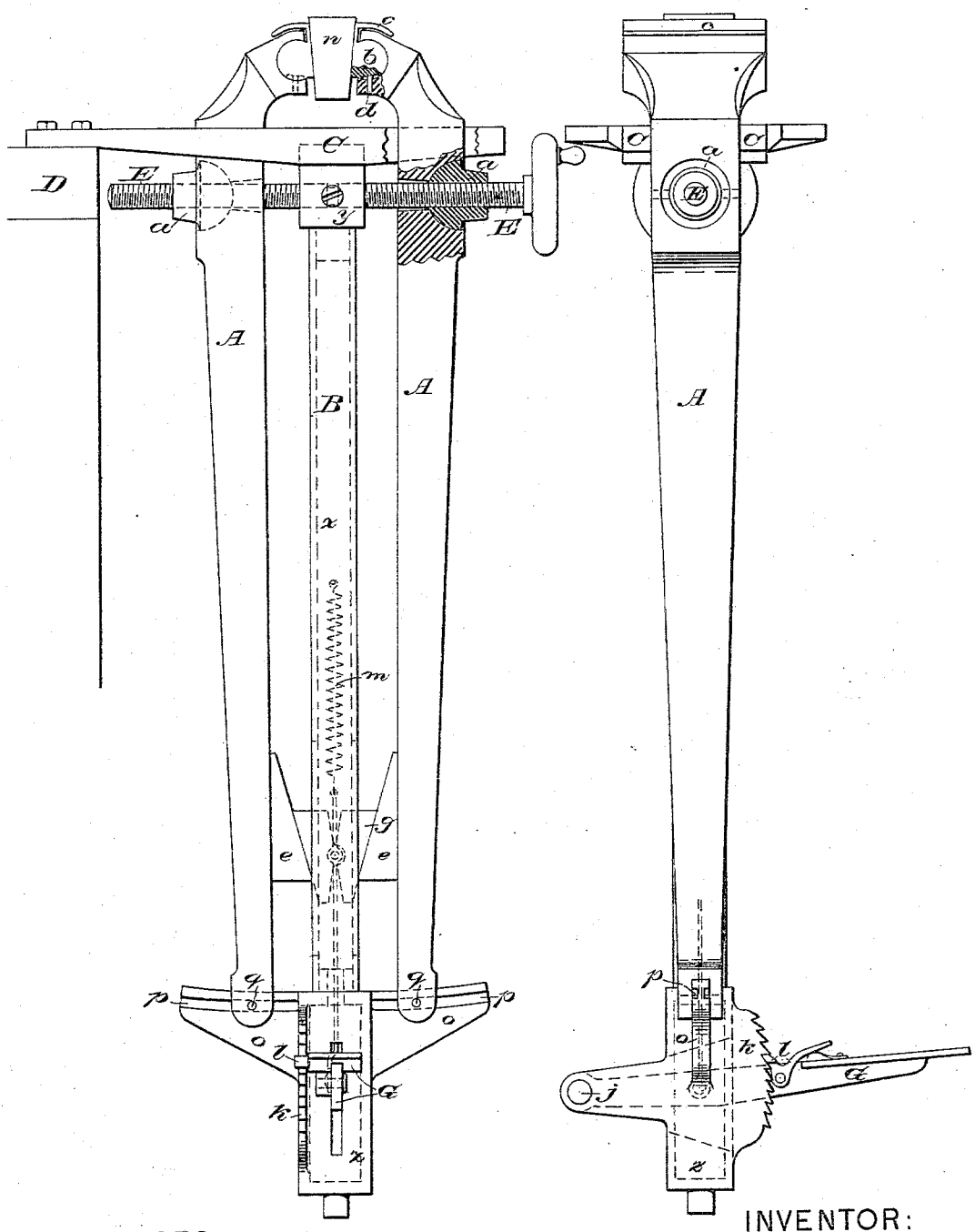

UNITED STATES PATENT OFFICE.

JOSEPH GOODRICH, OF HENRY, ILLINOIS, ASSIGNOR, BY DIRECT AND MESNE ASSIGNMENTS, TO MOSES A. HAWKES, OF EVANSTON, ILLINOIS, AND JOHN C. McKEE, OF ALLEGHENY CITY, PENNSYLVANIA.

FOOT-POWER BENCH-VISE.

SPECIFICATION forming part of Letters Patent No. 378,362, dated February 21, 1888.

Application filed June 19, 1884. Renewed January 21, 1887. Again renewed December 8, 1887. Serial No. 257,275. (No model.)

*To all whom it may concern:*

Be it known that I, JOSEPH GOODRICH, a citizen of the United States, residing at Henry, Marshall county, Illinois, have invented certain Improvements in Foot-Power Bench-Vises, of which the following is a specification.

My invention relates, in the main, to large bench-vises; and my object is in part to provide a novel device for effecting the clamping through the medium of the foot, and in part to provide certain improvements in the central stock of the vise, all as will be hereinafter fully described.

In former patents granted to me I showed a vise comprising a central stock, two jaws, a head and tail screw, and rocking nuts. By means of the head-screw the jaws were set up to the piece to be clamped, and by means of the tail-screw the tails of the jaws were spread so as to cause their heads to grip the piece to be clamped, the head-screw being the fulcrum. The rocking nuts permitted the jaws to rock on the fulcrum or head-screw. In my present application I show and employ some of these features; but I do not claim them broadly herein.

In the drawings which serve to illustrate my invention, Figure 1 is a side view of the vise shown as grasping a tapered block. Fig. 2 is an edge view of the same. Fig. 3 is an enlarged sectional view showing the expanding or spreading wedge. Fig. 4 is a cross-section on line 4 4 in Fig. 3.

Let A A represent the jaws of the vise; B, the central stock; C C, guides for the heads of the jaws fixed to B; D, a work-bench to which the guides C are secured for holding the vise in position, and E the head-screw, provided with right and left screw-threads at its ends, and arranged to rotate in the central stock, B, but prevented from running endwise therein. The screw E is provided with rocking nuts $a$ $a$ and a suitable crank or handle for rotating it.

The above elements, broadly considered, have been shown in my former patents. I will now describe the features I believe to be new.

In order to cause the faces of the jaws to bear evenly on a beveled or wedge-shaped piece, or on a plain-faced piece when the jaws do not stand parallel, I provide each jaw-head with a parti-cylindrical block, $b$, which fits in a corresponding recess in the jaw-head, and has a plain face to impinge against the piece clamped, and a curved shield, $c$, which extends back over the jaw-head. The recess in the jaw extends a little more than half-way around the cylindrical part of block $b$, which prevents the latter from dropping out, and to prevent it from moving endwise in its recess it may have a screw, $d$, which passes into the recess through the jaw-head and engages a slight recess in the block sufficiently elongated to permit the block to oscillate slightly. The shield $c$ prevents dust and filings from getting into the space necessarily left between the jaw-head and the piece clamped. This device is not new with me, and I do not claim it; nor is it essential to my invention. However, I usually employ it, and have therefore described it.

The central stock, B, comprises a tubular part, $x$, into which are secured a head-piece, $y$, and a foot-piece, $z$, the latter being also tubular or hollow. On the inner faces of the jaws are formed inclined planes $e$ $e$, and between these is arranged a wedge, $g$, which plays in a slot in the tubular part $x$ of stock B. Referring to Figs. 3 and 4, it will be seen that this wedge is made in two parts hinged together at $h$, which allows the wedge to adapt itself to the faces of the planes $e$, no matter what angle the latter may assume. This wedge is connected by a rod, $i$, with a treadle or foot-lever, G, fulcrumed at $j$. When this lever is depressed, the wedge $g$ is drawn down and the tails of the jaws separated or spread apart. In order to hold the depressed lever down without the necessity of keeping the foot on it, I provide a ratchet, $k$, on the foot-piece $z$ and a spring-pawl, $l$, mounted on the treadle or lever G. The wedge is retracted or lifted by a spring, $m$, arranged in the hollow of the stock B.

The operation is as follows: A piece, $n$, is placed between the open jaws, and the latter closed upon it through the head-screw with sufficient force to hold it in place. The operator now places his foot on treadle G and forces it down, thus spreading the tails of the jaws, and by causing them to turn on the rocking nuts $a$ as fulcrums brings the faces of the jaws forcibly together on the piece $n$. When he wishes to release piece $n$, he depresses the tail of the pawl $l$ with his foot. This frees it from the ratchet and allows the spring to retract the wedge $g$. In order that the retraction of the wedge may draw in the tails of the jaws, I prefer to form dovetails $e'$ on the wedge to engage corresponding grooves in the inclined planes $e$, as best shown in Fig. 4. In order to steady and guide the tails of the jaws, I provide guides $o\ o$, which branch from the foot-piece $z$ and engage cross grooves or recesses in the tails of the jaws. The guides have grooves $p$ in their lateral faces or sides, which grooves receive the ends of pins $q$ in the tails of the jaws. A device similar to this is shown in my Letters Patent No. 308,356, dated November 25, 1884; but in the present case, wherein it is applied to a very long vise, the jaws of which are apt to be thrown out of parallelism to a considerable extent, I give to the tops of the guides and the grooves $p$ a curvature corresponding to a radius in length equal to the distance from the head-screw to said guides. As the pivotal fulcrum in the rocking nut will vary to and from the central stock at times, I do not make the pins $q$ to fit tightly into the grooves $p$. The pins and grooves might be omitted.

My object in constructing the central stock, B, as described is this: The solid head $y$ furnishes a solid bearing for the head-screw. The tubular middle part may be made very economically of tubing and be screwed or welded to the head and foot piece, and it forms a housing for the spring $m$ and rod $i$ and allows an axial draft on the wedge. The foot-piece $z$ is made hollow, preferably of cast metal, to receive the rod $i$ and its coupling to the treadle. I thus attain compactness and economy of construction, and avoid exposing the spring $m$ and rod $i$ to injury.

In lieu of employing two jaws and a central stock, I may omit the stock B and fix one of the jaws. This fixed jaw would then be provided with all the appurtenances of the central stock, except that only one guide $o$ and one-half of the wedge or toggle would be required. This construction I consider as a mere modification of that shown, and any one skilled in the art may readily make the change without further description.

I am aware that it is not new in ratchet parallel vises, usually designed for wood-workers' use, to provide a means for slightly spreading or moving outward the tail of the jaw by means of a foot-lever and ratchet device in order to effect the clamping of the jaw-heads, and this I do not broadly claim. My device is primarily designed for metal-workers where the variation in the size of the articles grasped is not great, but the strain on the jaws is quite heavy. My rocking nuts also permit of more angular divergence of the jaws than can be obtained by the usual construction.

Having thus described my invention, I claim—

1. The combination of the jaws and central stock, the head-screw and rocking nuts, the wedge and inclined planes, the retracting-spring for the wedge, the foot-lever coupled to the wedge, the ratchet and the pawl mounted on the foot-lever, all arranged to operate substantially as and for the purposes set forth.

2. The central stock, B, of the vise, composed of the tubular part or section $x$, the head-piece $y$, and the hollow foot-piece $z$, in combination with the vise-jaws and their inclined planes, the head-screw, the wedge, the retracting-spring, the rod $i$, and the treadle with its ratchet device, substantially as set forth.

3. In a vise, as a means for spreading the tails of the jaws, the inclined planes on the jaws, and the wedge $g$, made in two parts and hinged together at the middle, substantially as and for the purposes set forth.

4. In a vise, as a means for spreading the tails of the jaws, the inclined planes on the jaws, and the wedge $g$, made in two parts and hinged together, and said inclined planes and wedge provided, respectively, with dovetails, substantially as and for the purposes set forth.

In witness whereof I have hereunto signed my name in the presence of two subscribing witnesses.

JOSEPH GOODRICH.

Witnesses:
HENRY CONNETT,
ARTHUR C. FRASER.